United States Patent [19]
Yamaguchi et al.

[11] Patent Number: 5,865,263
[45] Date of Patent: Feb. 2, 1999

[54] HYBRID VEHICLE

[75] Inventors: Kozo Yamaguchi; Yoshikazu Yamauchi; Hideki Nakashima, all of Aichi-ken, Japan

[73] Assignee: Kabushikikaisha Equos Research, Japan

[21] Appl. No.: 609,762

[22] Filed: Feb. 23, 1996

[30] Foreign Application Priority Data

Feb. 28, 1995 [JP] Japan .................................. 7-063538

[51] Int. Cl.$^6$ .................................................. B60K 6/00
[52] U.S. Cl. ........................................................ 180/65.2
[58] Field of Search ................................ 180/65.2, 65.3, 180/65.4, 65.6, 65.8; 364/424.026; 123/179.3

[56] References Cited

U.S. PATENT DOCUMENTS

| | | | |
|---|---|---|---|
| 1,848,091 | 3/1932 | Winther | 180/65.2 |
| 3,566,717 | 3/1971 | Berman et al. | 180/65.2 |
| 3,623,568 | 11/1971 | Mori | 180/65.2 |
| 3,861,484 | 1/1975 | Joslin et al. | 180/65.2 |
| 4,022,164 | 5/1977 | Fuchs | 123/179.3 |
| 4,122,354 | 10/1978 | Howland | 123/179.3 |
| 4,196,785 | 4/1980 | Downing, Jr. | 180/65.4 |
| 4,335,429 | 6/1982 | Kawakatsu | 180/65.2 |
| 4,883,028 | 11/1989 | Wu | 123/179.3 |
| 5,343,970 | 9/1994 | Severinsky | 180/65.2 |
| 5,698,905 | 12/1997 | Rüthlein | 180/65.4 |

FOREIGN PATENT DOCUMENTS

| | | | |
|---|---|---|---|
| 0570234 | 5/1993 | European Pat. Off. . | |
| 4-294977 | 5/1994 | Japan | 180/65.2 |

Primary Examiner—Brian L. Johnson
Assistant Examiner—Frank Vanaman
Attorney, Agent, or Firm—Lorusso & Loud

[57] ABSTRACT

A hybrid vehicle has an engine and a generator/motor connected through a planetary gear unit to an output shaft and the output of the engine is distributed between the generator and the output shaft. The vehicle is smoothly started by a driving motor. When vehicle speed V reaches an engine starting speed V*, the speed of generator/motor is changed to cause the engine to rotate, the engine is ignited and driving continues with the output torque produced by the engine supplemented by the driving motor. The hybrid vehicle allows for a smooth start and improved driving comfort even if an engine interruption scheme for halting the engine is employed, for example, halting the vehicle while waiting for a traffic signal to change.

19 Claims, 8 Drawing Sheets

MAGNET

FIG. 10

——— ENGINE STARTING VEHICLE SPEED(V*)
----- ENGINE HALT VEHICLE SPEED(V**)

FIG. 11

HYBRID VEHICLE

BACKGROUND OF THE INVENTION

1. Field of the Invention

This invention relates to a hybrid vehicle and, more particularly, to a hybrid vehicle driven by a motor and an internal-combustion engine.

2. Description of the Related Art

Hybrid vehicles which use both a fuel-fed conventional engine and a motor using clean electric energy, have been developed. Various types of hybrid vehicles have been proposed, such as hybrid vehicles of the series type in which electric power generated by driving a generator by the output rotation of an engine, is changed into direct current to charge to a battery and electric power from the battery is changed into alternating current to drive a motor. Another hybrid vehicle is the parallel type in which the engine and the motor are connected to each other through a clutch, the motor is driven when starting, the clutch is subsequently engaged to drive the engine and the output of the motor is added to that of the engine when accelerating. Yet another type of hybrid vehicle is a combination of the series type and the parallel type.

In a hybrid vehicle, as in a more conventional vehicle using only an engine, the engine operates in an idling state even though the vehicle is halted. Therefore, fuel efficiency is reduced by consuming fuel when the vehicle is not moving. Further, the idling of the engine produces noise due to the idling and exhaust of gas. Consequently, an engine interruption system has been proposed in which the engine is operated only when the engine is needed for driving and, at other times, is turned off in order that the amount of exhaust gas amount is decreased and fuel consumption is improved. The foregoing suggests that such an engine interruption system might be employed for the hybrid vehicle of the parallel type. In the engine interruption system, the operation of the engine is halted when the vehicle is halted, the engine is started again when the accelerator pedal is operated, and then the vehicle is started in motion.

However, the engine interruption system inherently creates a number of problems. Firstly, the clutch must release or connect whenever the engine is stopped or started, with the result that the load on the clutch is increased. Secondly, the frequency of use of the starter is increased because the starter must engage whenever the engine is started, so that durability of the starter becomes a problem. Thirdly, the driving comfort suffers due to the timelag between when the engine is started again after the accelerator pedal is operated and the torque change when the engine output is transferred to the output shaft. If the clutch is immediately connected in order to decrease the timelag, the load on the clutch is further increased.

SUMMARY OF THE INVENTION

Accordingly, the first object of the present invention is to provide a hybrid vehicle which is capable of smoothly starting and of maintaining driving comfort.

The second object of the present invention is to provide a hybrid vehicle which uses an engine interruption system but does not use the starter and the clutch for each stop and start of the engine.

To attain the aforementioned objects the present invention provides a hybrid vehicle which is distinguished by a distribution means which distributes the output torque of the engine between a drive shaft and an input shaft of a generator/motor. The hybrid vehicle of the present invention further includes a motor connected to the drive shaft; a generator/motor control means for controlling the rotational speed of the generator/motor; a generator torque computation means computing the output torque of the generator/motor which is controlled as the rotational speed of the generator/motor is controlled by the generator/motor control means; a driving judgment means for judging whether or not the vehicle is moving; and a motor torque compensating means for changing the output torque of the motor in accordance with the torque computed by the generator torque computation means, to compensate for drag imposed by the engine during start-up after the driving judgment means judges that the vehicle is moving.

The distribution means has a differential gear device including a first element connected to the generator, a second element connected to the engine and a third element connected to the drive shaft. The differential gear device, in turn, may be a planetary gear unit wherein, in one embodiment, the first element is a sun gear, the second element is a carrier, and the third element is a ring gear.

The driving judgment means includes vehicle speed detection means for detecting vehicle speed, and the aforementioned generator/motor control means operates to turn over and start the engine when the vehicle speed detected by the vehicle speed detection means exceeds a predetermined value.

The hybrid vehicle of the present invention further includes means for detecting the degree of accelerator (throttle) opening, and the aforementioned generator/motor control means is responsive to change in the detected degree of accelerator opening. The generator/motor control means may also cause the vehicle speed predetermined for starting the engine to change in response to the temperature of the engine.

The hybrid vehicle of the present invention further includes a battery and a storage residual capacity detection means for detecting the residual capacity of the battery. The vehicle speed is changed in response to the residual capacity of the battery as detected by the storage residual capacity detection means.

Driving force instruction value detection means is provided for detecting the required driving force, so that the engine is turned off when a signal detected by the driving force instruction value detection means is smaller than a predetermined value, and the engine is started when the signal is larger than the predetermined value.

The aforementioned compensating torque is defined in accordance with the generator/motor torque, inertia of the generator, the gear ratio of the differential gear device and the counter gear ratio, where the distribution means is composed of the generator having a stator connected to the engine and a rotor connected to the drive shaft.

Consequently, in the hybrid vehicle according to the present invention, after the engine is started, the engine torque is transferred to the drive shaft and to the input shaft of the generator by the distribution means. That is, the distribution means includes a differential gear device, for example, a planetary gear unit in which the sun gear as the first element is connected to the generator, the carrier as the second element is connected to the engine, and the ring gear as the third element is connected to the drive shaft, i.e. the output shaft. Alternatively, the distribution means may be composed of the generator having its stator connected to the engine and the rotor connected to the driving shaft.

The generator/motor control means controls the rotational speed of the generator, and the controlled rotational speed of the generator is utilized to start the engine.

The generator torque computation means computes the torque produced by the generator in controlling its rotational speed. When the driving judgment means judges that the vehicle has been started in motion and that the engine is being started, the motor torque supplement means increases the output torque of the motor to compensate for the drag produced by the starting of the engine, based on the torque computed by the generator torque computation means. The compensatory torque to be output by the motor is computed based on the generator torque, inertia of the generator, the gear ratio of the differential gear device and the counter gear ratio.

According to the present invention, the vehicle can be smoothly operated to maintain driving comfort during the starting of the engine.

Furthermore, a starter and clutch are unnecessary, even if an engine interruption scheme is used in operation of the hybrid vehicle.

DETAILED DESCRIPTION OF THE PREFERRED EMBODIMENT(S)

The preferred embodiments of a hybrid vehicle according to the present invention will be explained in detail with reference to FIG. 1 to FIG. 11.

Figure 1:
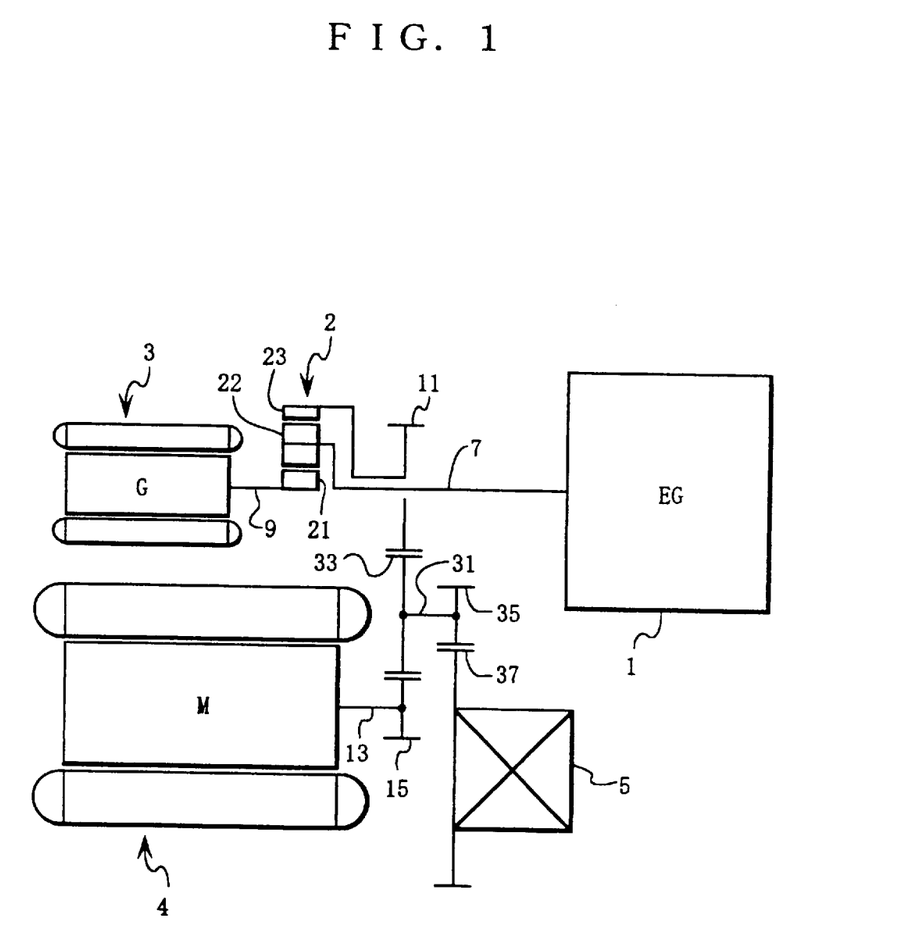
FIG. 1 is a schematic view of a drive train in a hybrid vehicle in accordance with a preferred embodiment of the present invention.

In the embodiment as shown in FIG. 1, the drive train has a four-shaft structure and includes an engine (EG) 1, a planetary gear unit 2, a generator/motor (generator G) 3, a driving motor (M) 4 and a differential gear unit 5.

The first shaft is the combination of output shaft 7 of the engine 1 and the input/output shaft 9 of the generator/motor 3. The planetary gear unit 2 has a carrier 22 connected to the output shaft 7 of the engine 1, a sun gear 21 connected to the input/output shaft 9 of the generator/motor 3 and a ring gear 23 connected to the first counter drive gear 11.

The second shaft is the output shaft 13 of the driving motor 4, which carries the second counter drive gear 15 connected thereto.

The third shaft is a counter shaft 31 supporting a counter driven gear 33 and a dif-pinion gear 35. The counter driven gear 33 is meshed with the first counter drive gear 11 and the second counter drive gear 15.

The fourth shaft is the input shaft for the differential gear unit which carries a dif-ring gear 37.

A differential gear unit 5 is driven by the dif-ring gear 37 mounted on the fourth shaft with the dif-ring gear 37 being meshed with the dif-pinion gear 35.

In the planetary gear unit 2, the rotational speed of the sun gear 21 defines the output rotational speed of the ring gear 23 in response to the input rotational speed of the carrier 22. That is, the rotational speed of the sun gear 21 can be controlled by controlling the torque output of the generator/motor 3. For example, when the sun gear 21 is freely rotated, the rotation of the carrier 22 causes the sun gear 21 to rotate, but does not cause the ring gear 23 to rotate, whereby no rotation is output.

In the planetary gear unit 2, the input torque to the carrier 22 is a combined torque obtained by combining the reaction torque of the generator/motor 3 and the output torque of the engine 1.

More specifically, the output from the engine 1 is input to the carrier 22, and the output from the generator/motor 3 is input to the sun gear 21. The output torque of the engine 1 is output from the ring gear 23 through the counter drive gear 11 to drive the wheels at a gear ratio based on the engine efficiency. Furthermore, the output of the driving motor 4 is output through the second counter drive gear 15 to the driving wheels at a sufficient gear ratio for motor efficiency.

Figure 2:
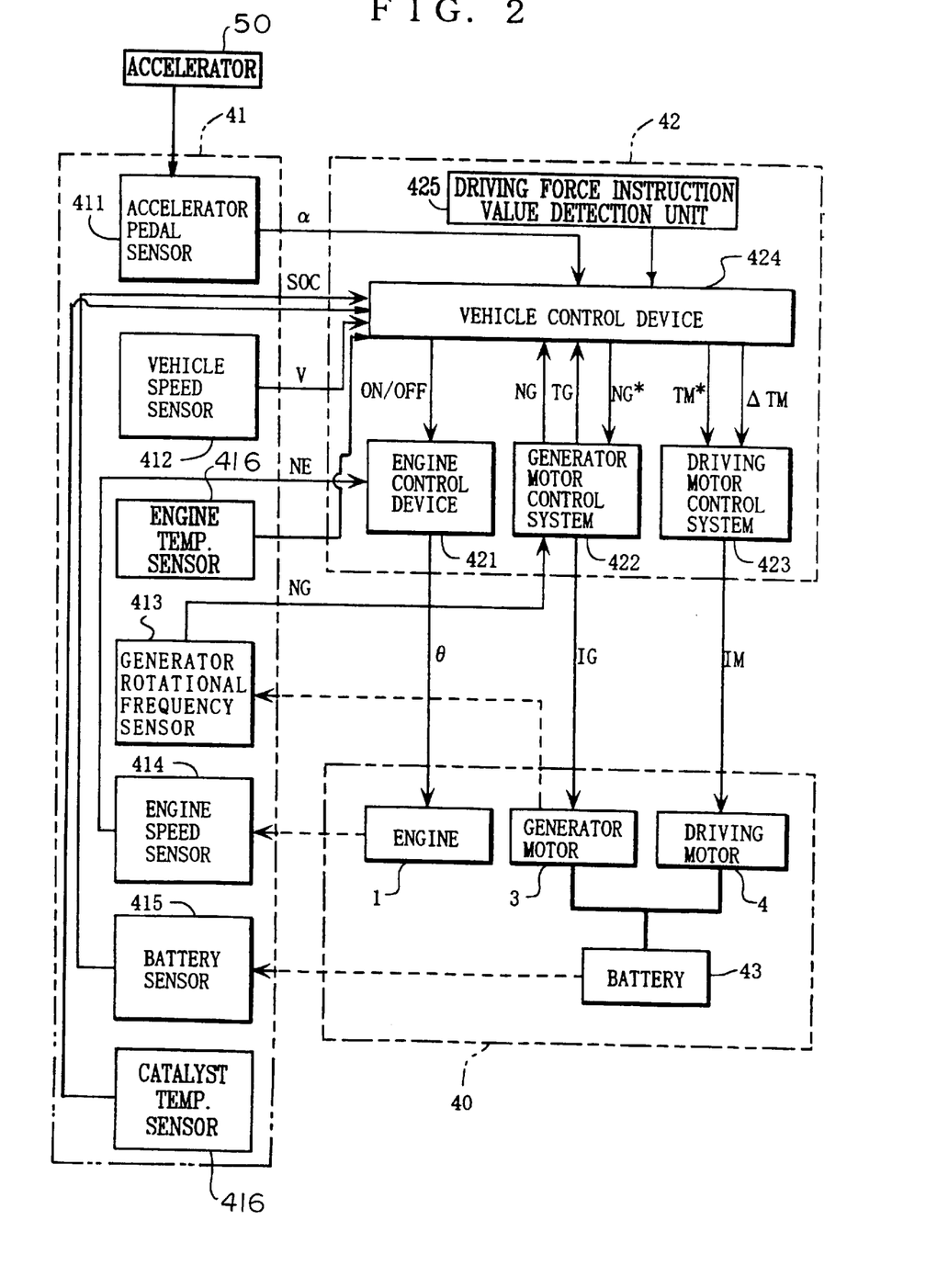
FIG. 2 is a block diagram of a control system for the hybrid vehicle according to an embodiment of the present invention.

FIG. 2 describes the structure of the control system for the above-described embodiment of a vehicle. As is seen from FIG. 2, the hybrid vehicle includes a driving unit 40, a sensor unit 41 detecting the operating parameters of the driving unit 40 and so on, and a control unit 42 for controlling each element of the driving unit 40.

The driving unit 40 includes the engine 1, the generator/motor 3, the driving motor 4 and a battery 43. The battery 43 supplies electric power to the driving motor 4 and, in turn, is charged with regenerative electric power generated by the driving motor 4 and electric power generated by the generator/motor 3 operating in a generator mode.

The sensor unit 41 includes an accelerator pedal sensor 411 for detecting the degree that the accelerator 50 is opened, a vehicle speed sensor 412 for detecting vehicle speed V, a generator/motor rotational speed sensor 413 for detecting the rotational speed of the generator/motor 3, an engine speed sensor 414 for detecting the engine speed of the engine 1, a battery sensor 415 for detecting the stored residual capacity (SOC) of the battery 43 and an engine temperature sensor 416.

The control unit 42 includes an engine control unit 421 for controlling the engine 4, a generator/motor control unit 422 for controlling the generator/motor 3, and a driving motor control unit 423 for controlling the driving motor 4. Furthermore, the control unit 42 has a vehicle control unit 424 for controlling the movement of the vehicle by supplying a control instruction or a control value to the engine control unit 421, the generator/motor control unit 422, the driving motor control unit 423 and driving force instruction value detection unit 425.

More specifically, the vehicle control unit 424 supplies the engine control system 421 with ON/OFF signals for the engine, in response to various detected conditions of the vehicle, including signals indicating that the vehicle is either moving or halted.

The vehicle control system 424 supplies the generator/motor control unit 422 with a target rotational speed NG* for the generator/motor 3, the target rotational speed being based on the degree the accelerator is opened ($\alpha$), as detected by the accelerator pedal sensor 411, and the stored residual capacity (SOC), as detected by the battery sensor 415. The vehicle control unit 424 also supplies the driving motor control unit 423 with a torque signal TM* based on the degree the accelerator is opened $\alpha$, as detected by the accelerator pedal sensor 411, and the vehicle speed V as detected by the vehicle speed sensor 412. Moreover, the vehicle control system 424 computes a $\Delta$TM value based on the values for generator rotational speed NG and generator torque TG which are received from the generator/motor control unit 422.

The engine control unit 421 controls the output of the engine 1 by controlling the degree of throttle opening $\theta$, responsive to the ON signal received from the vehicle control unit 424 and an engine speed NE signal received from the engine speed sensor 414.

The generator/motor control unit 422 controls the electric current (torque) IG to achieve a target rotational speed NG*.

The driving motor control unit 423 controls the electric current (torque) IM which drives motor 4, responsive to signals for the torque TM* and the compensatory torque $\Delta$TM which are received from the vehicle control unit 424.

The operation of each control system of the above-described embodiment will now be described.

The driving motor 4 starts the vehicle in motion and, when the vehicle speed reaches a predetermined speed, the engine 1 is started by controlling the rotational speed of the generator/motor 3, with the torque output by the driving motor 4 being increased by $\Delta$TM to compensate for the drag produced by the engine 1 in starting. This drag may be detected as a change in torque output of the generator/motor 3.

Starting of the engine 1 by control of the speed of rotation of generator/motor 3 will now be explained. When the vehicle starts in motion, the engine 1 is not running and the vehicle begins moving by the torque of the driving motor 4 alone. In this state, the output shaft (ring gear 23) is rotated by the driving motor 4. As can be understood, it is necessary that the carrier not be in orbital (planetary) motion so as not to rotate the output shaft 7 of the engine 1. In this initial low speed state, with the vehicle powered by the motor 4 only, the generator 3 as driven in a generator mode to generate electricity, i.e. the ring gear 23 drives the sun gear 21 through the carrier 22, the carrier 22 remaining stationary.

When the vehicle reaches a predetermined speed, the engine 1 is started. At this moment, the rotational speed of the sun gear 21, i.e. that of generator/motor 3, is decreased and, because the rotational speed of the ring gear has not changed, the carrier 22 is forced to begin its planetary motion around the sun gear 21, thereby rotating the output shaft 7 of the engine 1. In other words, the rotational speed of the output shaft 7 is naturally affected by both the rotational speed of the sun gear 21 and that of the carrier 22. According, if the rotational speed of the output of motor 4 is kept constant and the rotational speed of the sun gear 21 is decreased, the rotational speed of the carrier 22 is increased to rotate the engine 1.

When the rotation of the sun gear is stopped, the entire rotation of the motor 4 is transmitted to the carrier. Accordingly, engine 1 connected to the carrier may be rotated faster by driving, as a motor, the generator/motor 3 connected to the sun gear.

Accordingly, in the present invention the engine 1 can be started by controlling the generator/motor 3 to decrease its rotational speed in the generator mode while the vehicle is powered by the driving motor 4 alone, or by changing the generator/motor 3 over into the motor mode of rotation.

As noted above, when the rotation of the sun gear is stopped, the entire rotation of the motor 4 is transmitted to the carrier to thereby rotate the engine 1. In other words, at this point in time the entire torque to rotate the engine 1 is provided by the drive motor 4. Accordingly, when starting the engine, a drop in the transmitted torque ("torque fluctuation") would be expected due to the drag on the motor 4 created by the work, i.e. compression, etc., performed in driving the engine (turning over the engine). In the present invention, this torque fluctuation is calculated and the current IM to the motor 4 is increased to compensate for it.

Figure 3:
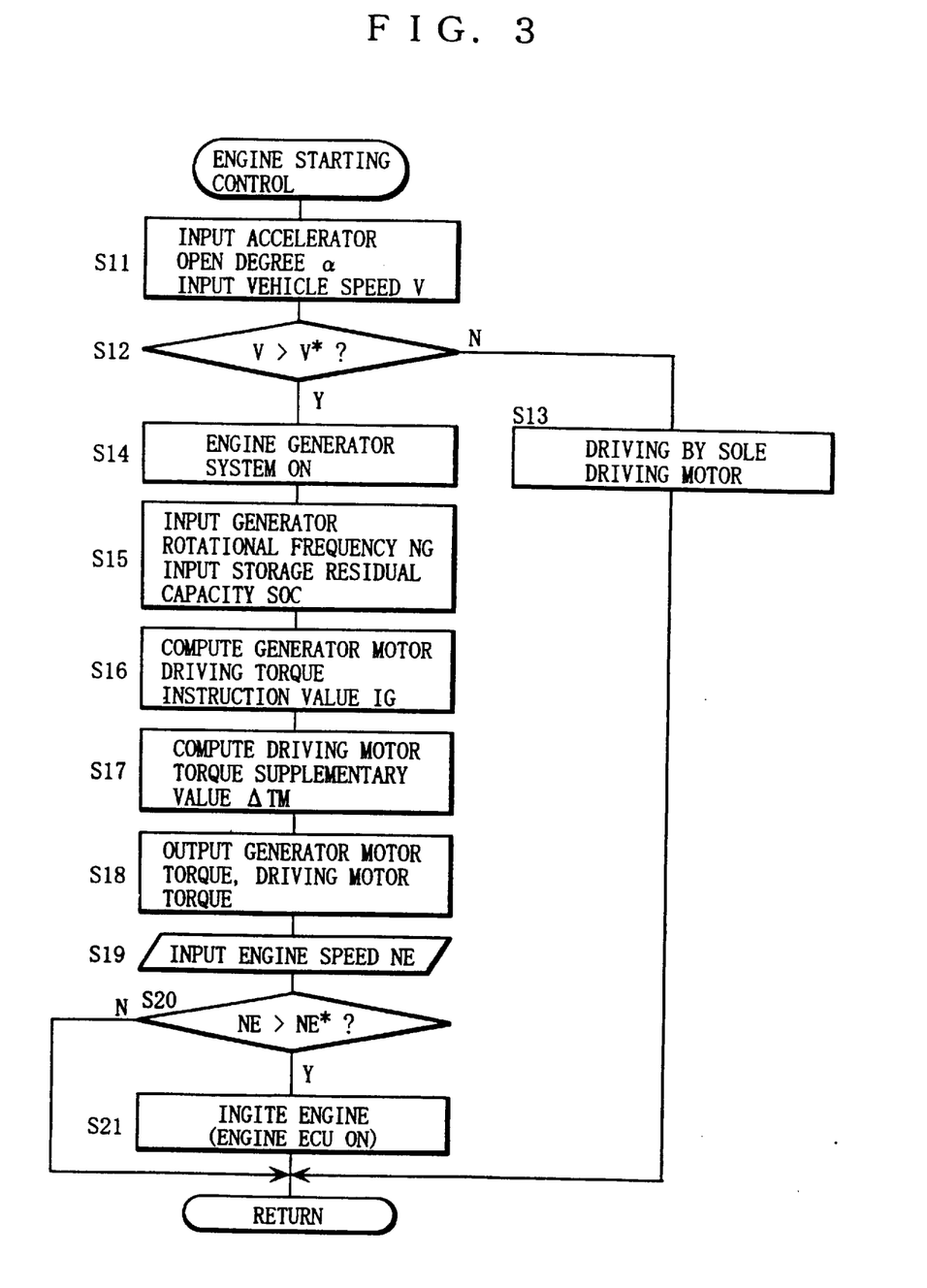
FIG. 3 is a flow chart of an engine starting control routine utilized in the first embodiment of the hybrid vehicle of the present invention.

FIG. 3 illustrates the engine starting control routine wherein, in step S11, the vehicle control unit 424 inputs the degree the accelerator opening $\alpha$ received from the accelerator pedal sensor 411 and the present vehicle speed V from the vehicle speed sensor 412. Next, in step S12, the vehicle control unit 424 judges whether or not the vehicle speed V has reached the engine starting speed V*.

When the vehicle speed V is below the engine starting speed V* ("No" in S12), the vehicle control unit 424 controls only the driving motor 4 (Step S13). More specifically, the vehicle control unit 424 supplies an OFF signal to the engine control unit 422 and determines the target driving motor torque TM* based on the values for accelerator opening $\alpha$ and the vehicle speed V by reference to a driving motor torque—vehicle speed chart, as exemplified in FIG. 4, and supplies that value TM* to the driving motor control unit 423. The driving motor control unit 423 controls the electric current IM to the driving motor 4 so that the detected driving motor torque TM becomes TM*, i.e. TM=TM*.

On the other hand, when the vehicle speed V has been increased by the driving motor 4 to a value exceeding the engine starting speed V* (Yes in S12), the vehicle control unit 424 sends an ON signal to the engine control unit 421 (Step S14).

Next, the vehicle control unit 424 inputs a signal SOC representative of the storage residual capacity of the battery 43 from the battery sensor 415, and the generator/motor control unit 422 inputs a generator motor rotational speed value NG based on the signal received from the generator/motor rotational speed sensor 413 (Step S15).

A generator/motor driving torque instruction value IG is computed (Step S16). The vehicle control unit 424 determines the target rotational speed NG* for the generator/motor 3 by reference to the chart shown in FIG. 5, applying the degree of accelerator opening $\alpha$ input at Step 11 and the storage residual capacity SOC of the battery 43 input at Step 15, and supplies a signal for NG* to the generator/motor control unit 422. The generator/motor control unit 422 computes the generator/motor torque instruction value (an electric current IG) for obtaining the target rotational frequency NG* by means of feedback control utilizing the difference between the target rotational speed NG* and the detected rotational speed NG of the generator/motor 3 input at Step S15.

The vehicle control unit 424 computes a driving motor torque compensatory value ΔTM to compensate for the torque change, produced by a change in the speed of the generator/motor 3 upon start of turning over the engine, by changing the current IM to the driving motor 4 (Step 17).

Figure 6:
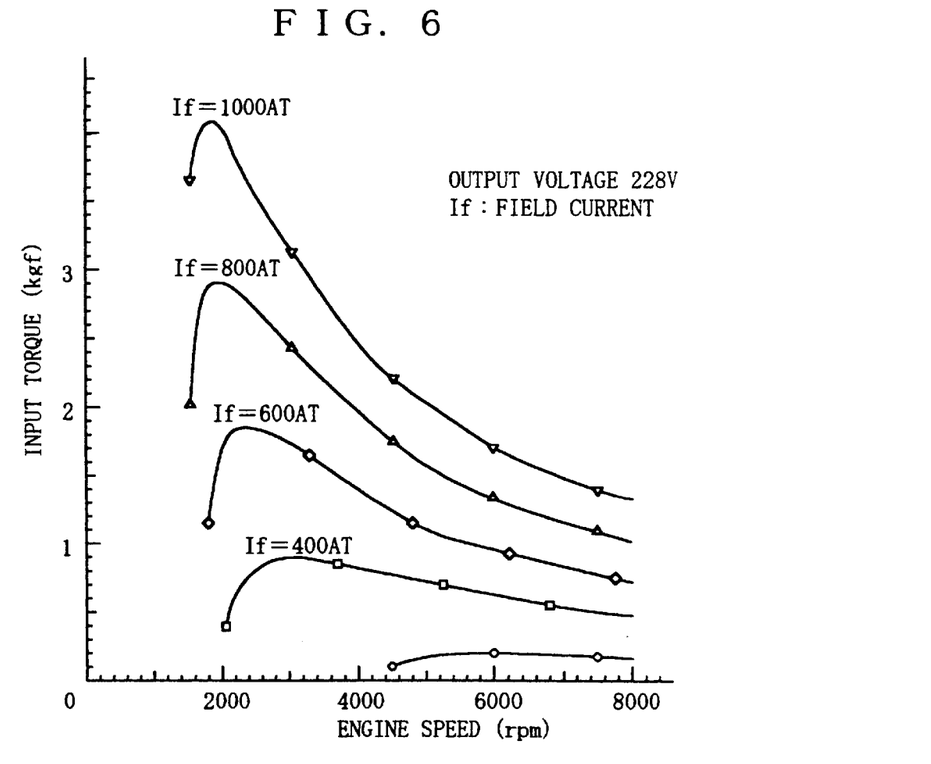
FIG. 6 is a graph (map) of generator torque versus rotational speed, at various values If (excitation current), for a generator/motor of the excitation type in an embodiment of the hybrid vehicle according to the present invention.

The generator/motor control unit 422 computes the generator/motor torque TG from the generator/motor current IG, because the torque of the generator/motor 3 is proportional to the electric current when the generator/motor 3 is the conventional magnetic type. On the other hand, when the generator/motor 3 is the excitation type, the generator/motor control unit 422 determines the generator/motor torque TG from a torque—rotational speed chart, as shown in FIG. 6, for the specific excitation current If.

The vehicle control unit 424 computes the driving motor torque compensatory value ΔTM based on the generator/motor torque signal TG supplied from the generator/motor control unit 422. More specifically, because the generator/motor angular acceleration (the rotational speed change rate) αG is extremely small, the generator/motor torque TG and the sun gear torque TS can be treated as equal (TG=TS).

When the number of the teeth of the ring gear 23 in the planetary gear unit 2 is twice the number of teeth of the sun gear 21, the ring gear torque TR is twice the generator/motor torque TG (TR=2·TG), with the result that the compensatory torque ΔTM can be represented by the following equation 1 when the counter gear ratio is defined as i.

$$\Delta TM = 2 \cdot i \cdot TS$$

Incidentally, taking into account the generator/motor rotation change ratio G, when the generator/motor inertia is defined as InG, the sun gear torque TS in equation 1 becomes TS=TG+InG·αG.

As shown in FIG. 2, The vehicle control unit 424 supplies the driving motor control unit 423 with a signal for the compensating driving motor torque ΔTM in order to compensate for the torque TG used driving the generator/motor 3 operating as a generator. Further, the vehicle control unit 424 computes the target driving motor torque TM*, ignoring the torque acceleration, by applying the detected vehicle speed V to the map of FIG. 4, and supplies the signal TM* to the driving motor control unit 423.

After the aforementioned computations, the generator/motor control unit 422 outputs to the generator/motor 3 a generator/motor driving torque instruction value IG computed at Step 16 to produce an output torque TG. The driving motor control unit 423 outputs to the driving motor 4 a torque signal (electric current) IM to produce a driving motor output torque TM (TM=TM*−ΔTM), based on the target driving motor torque TM* and the compensatory driving motor torque value ΔTM which are computed at Step 17 (Step 18).

To start the engine 1, the rotation of generator/motor 3 is reversed, with the additional torque requirement for rotating the engine being provided by the driving motor 4.

The engine control unit 421 receives the engine speed NE signal from the engine speed sensor 414 (Step S19), and judges whether or not the engine speed NE has reached the computed engine speed NE* capable of igniting the engine (Step S20). When the detected engine speed has not reached NE* ("No" in Step S20), the routine returns to the mainroutine and waits until there is an increase in the detected engine speed NE. On the other hand, when the detected engine speed NE exceeds NE* ("Yes" in Step S20), the engine control unit 421 ignites the engine 1 by switching the engine ECU signal to ON (Step S21).

Figure 7:
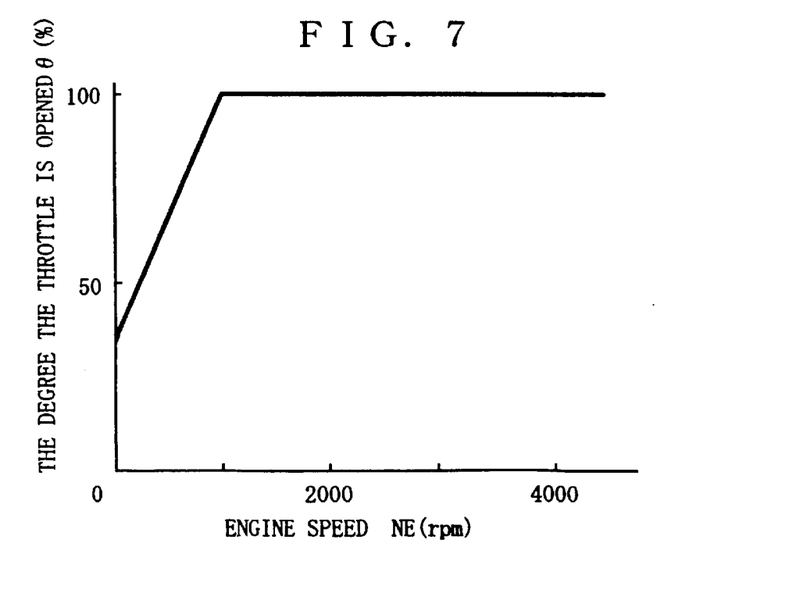
FIG. 7 is a graph of the relationship between engine speed NE and the degree of throttle opening α in an embodiment of the hybrid vehicle according to the present invention.

Then, when the engine 1 has been started, the degree of throttle opening θ is controlled in response to the engine speed NE to follow the relationship predetermined to produce economy of fuel consumption as shown in FIG. 7. In other words, the engine control unit 421 controls the engine output by controlling the degree of throttle opening θ in response to the detected engine speed NE as shown in FIG. 7, with the degree of accelerator opening α input to the vehicle control unit 424.

Figure 4:
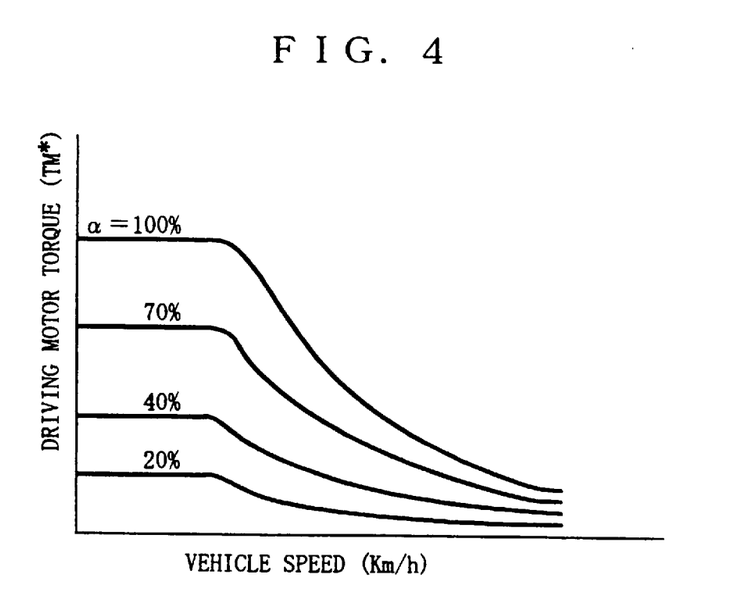
FIG. 4 is a graph (map) of the relationship between driving motor torque, vehicle speed, and degree of throttle opening α in an embodiment of the hybrid vehicle according to the present invention.
Figure 5:
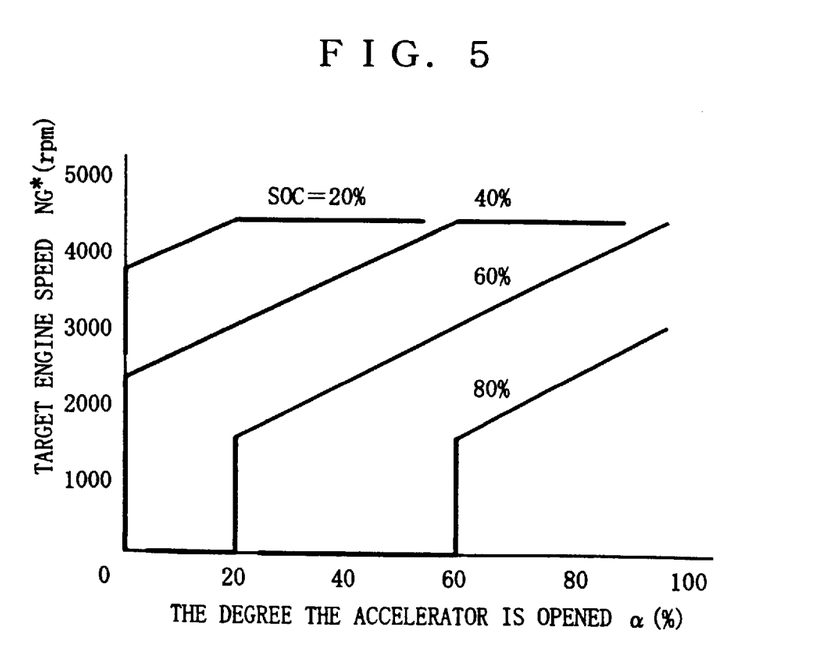
FIG. 5 is a graph (map) of the relationship between target rotational speed NG*, the degree of accelerator opening α and storage residual capacity SOC in an embodiment of the hybrid vehicle according to the present invention.

The aforementioned operation of each unit will now be described with reference to the time-chart of FIG. 8. At time t1, the vehicle starts in motion when the accelerator pedal is depressed. At this time, the driving motor 4 outputs a torque TM with TM=TM*, TM* being computed from the detected degree of accelerator opening α and the detected vehicle speed V (zero at the start), utilizing a map as shown in FIG. 4. This initial torque TM is indicated by Arrow A in FIG. 8.

The generator/motor 3 is rotated by the output of the driving motor 4, as transmitted through the output shaft ("second shaft") 13 and the ring gear 23 of the planetary gear unit 2. At this time, the ring gear 23 geared to the output shaft 13 is rotated in the positive direction, and the carrier 22 mounted on output shaft 7 of the engine 1 is halted, whereby the sun gear 21, mounted on the output shaft of the generator/motor 3 is rotated in the negative direction. The generator/motor rotational speed NG thereby gradually increases in the negative direction (Arrow B in FIG. 8).

The vehicle speed is gradually increased by the output torque TM of the driving motor 4 (Arrow C in FIG. 8), and at time t2, the engine 1 is driven by the generator/motor 3 when the vehicle speed reaches the engine starting speed V*, e.g. 10 Km/h. That is, the rotation of generator/motor 3 in the negative direction for generating electricity is changed to rotation in a positive direction (motor mode) to allow for starting the engine (Arrow D in FIG. 8).

Figure 8:
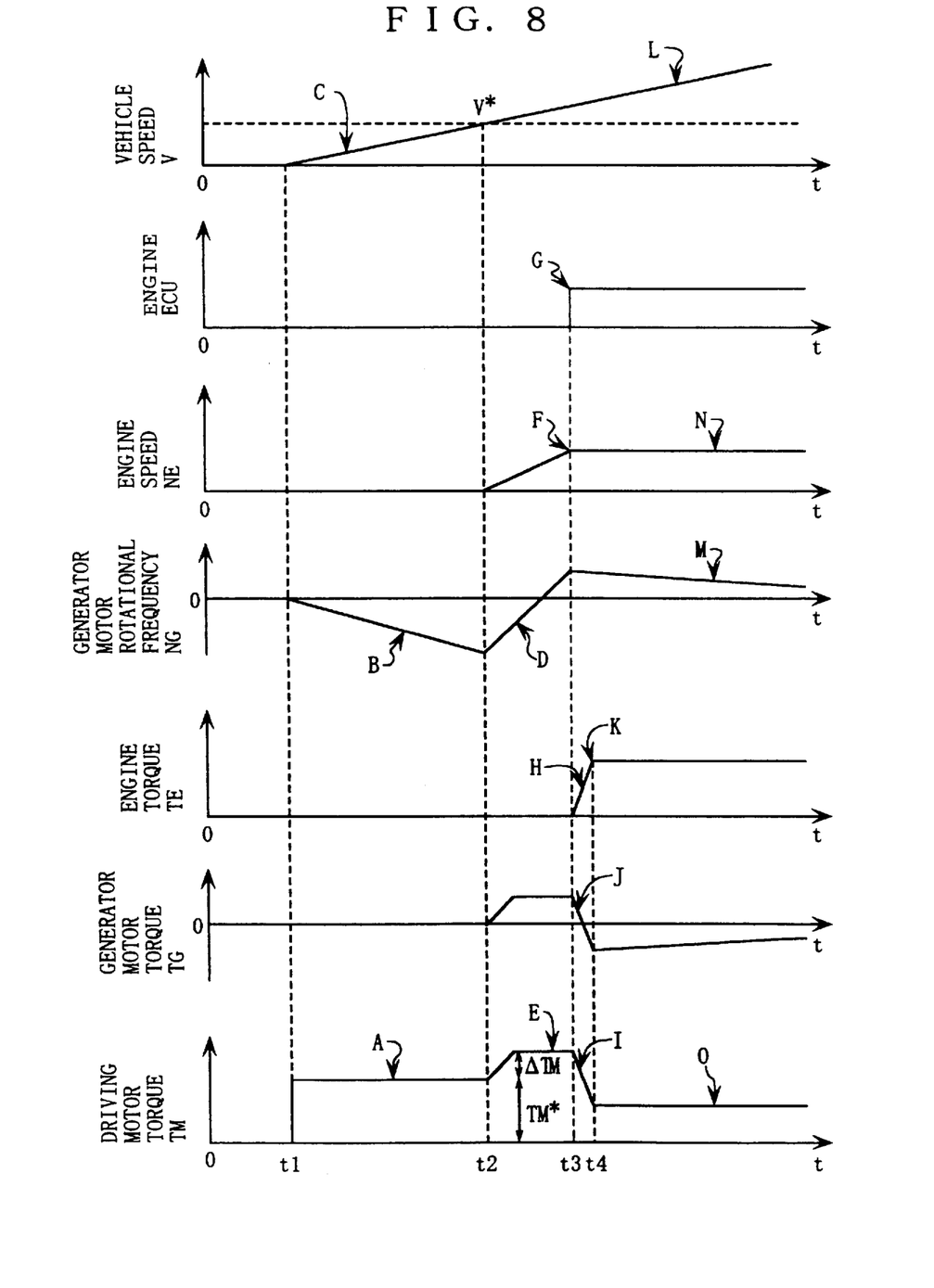
FIG. 8 is a time chart for various operating parameters of an embodiment of the hybrid vehicle according to the present invention.

In operation as a motor, the torque ΔTM of the generator/motor 3 is output at shaft 9 and TM=TM*+ΔTM becomes the value output by driving motor 4 to the ring gear 23 in the planetary gear unit 2 (Arrow E in FIG. 8).

The rotational speed of the generator/motor 3 (Arrow D in FIG. 8) is increased to a value allowing efficient engine operation in accordance with the predetermined map. The additional torque shown in line D as a sharp increase and which is required to start the engine, i.e. required to overcome engine drag, is provided by the driving motor 4.

While the engine torque TE is shown in FIG. 8 to be initially zero, actually there is a reaction torque produced in the engine 1 by the generator/motor 3. In other words, the engine 1 receives the torque in the negative direction to function as a brake. The driving motor 4 covers (compensates for) the loss of torque caused by deceleration of the ring gear 23 connected to the output shaft.

At time t3, when the engine rotational speed NE exceeds the predetermined value NE*, for example 600 rpm (Arrow F in FIG. 8), the engine ECU is switched to ON to allow the engine to ignite (Arrow G). Thereafter, the engine torque TE starts increasing (Arrow H in FIG. 8), so that the output of the driving motor 4 decreases (Arrow I in FIG. 8). At this time, the generator/motor 3 becomes a reaction element for the engine 1, and the torque in the negative direction for the planetary gear unit 2 decreases in order to further decrease the reaction force as the engine torque TE increases (Arrow J in FIG. 8).

The engine torque TE is produced a bit late (Arrow K in FIG. 8), as the vehicle speed V increases after completely transferring the engine torque TE (Arrow L in FIG. 8) and the rotational speed of the generator/motor 3, operating as a generator, decreases (Arrow M in FIG. 8). Thereafter, the engine speed NE is regulated to provide maximum efficiency (Arrow N in FIG. 8).

The torque TM of the driving motor 4 is fixed (Arrow O) and the rotational speed of the generator/motor 3 is decreased, so that the rotation of the ring gear 23 connected to the output shaft is increased so as to increase torque and, as a consequence, the vehicle speed V is also increased.

A second embodiment of a drive train in accordance with the present invention will now be described with reference to FIG. 9. In the description of this second embodiment, the same reference numerals as used in describing FIG. 1 will be used to designate components the same as or similar to those of the first embodiment and the description thereof will be omitted.

Figure 9:
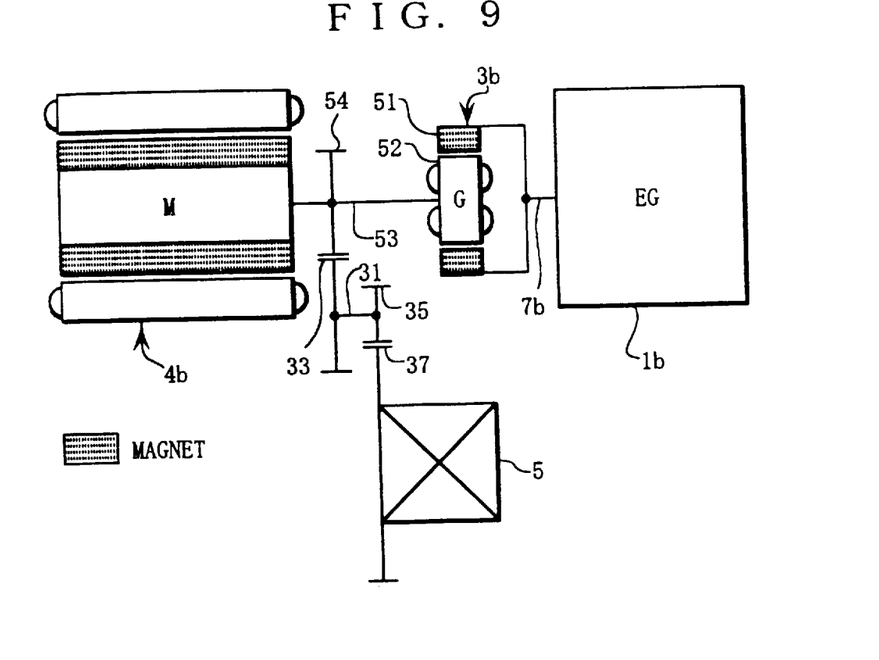
FIG. 9 is a schematic view of a drive train in a hybrid vehicle in accordance with a second embodiment of the present invention.

In the second embodiment as shown in FIG. 9, an output shaft 7b for engine 1b is connected to a stator 51 (not held by the case) of a generator/motor 3b, and rotor 52 of the generator/motor 3b is connected to an output shaft 53. Further, a driving motor 4b is connected to the same output shaft 53. A counter drive gear 54 is mounted on output shaft 53, and is meshed with the counter driven gear 33 mounted on the counter shaft 31.

In the first embodiment, since the engine 1 and generator/motor 3 are connected through the planetary gear unit 2 to the output shaft, the torque TR of the ring gear 23 connected to the output shaft is twice the generator/motor torque TG. On the other hand, in the second embodiment there is no such interposed planetary gear unit and the output shaft torque is equal to the generator/motor torque TG, regardless of the gear ratio, with the result that the compensatory torque $\Delta TM$ contributed by the driving motor 4b becomes $\Delta TM = TG + InG \cdot \alpha G$.

Figure 10:
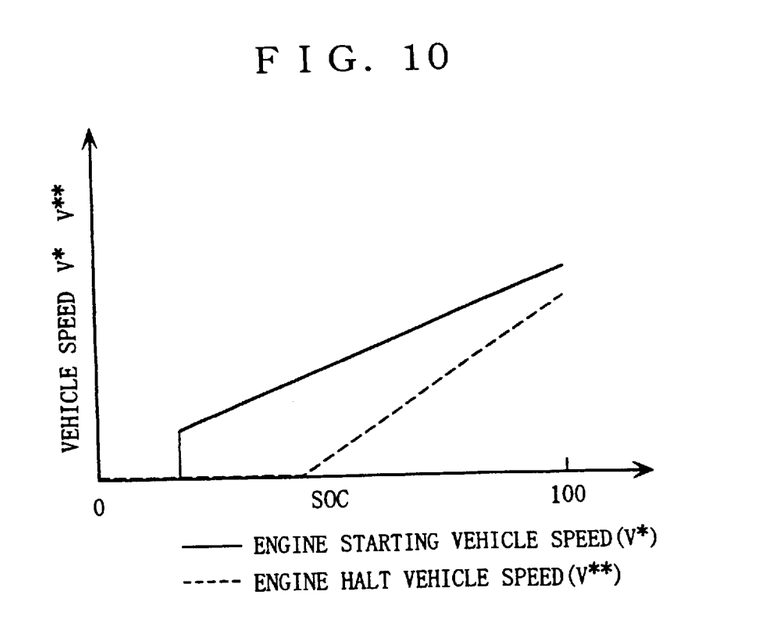
FIG. 10 is a graph of the relationship between engine starting speed V* and the storage battery residual capacity SOC in a third embodiment of the present invention.

In a third embodiment of the invention the engine starting speed V*, defined as a fixed, predetermined value in the first embodiment, is changed in accordance with the storage residual capacity SOC of the battery 43, as shown in FIG. 10.

More specifically, as shown in FIG. 10, as the battery 43 is charged by generator/motor 3, operated as a generator, i.e. as the SOC value increases, the EG starting vehicle speed (V*) and the EG stopping vehicle speed (V**) increase. Hunting is prevented by maintaining a difference between the EG starting vehicle speed (V*) and the EG stopping vehicle speed (V**).

Figure 11:
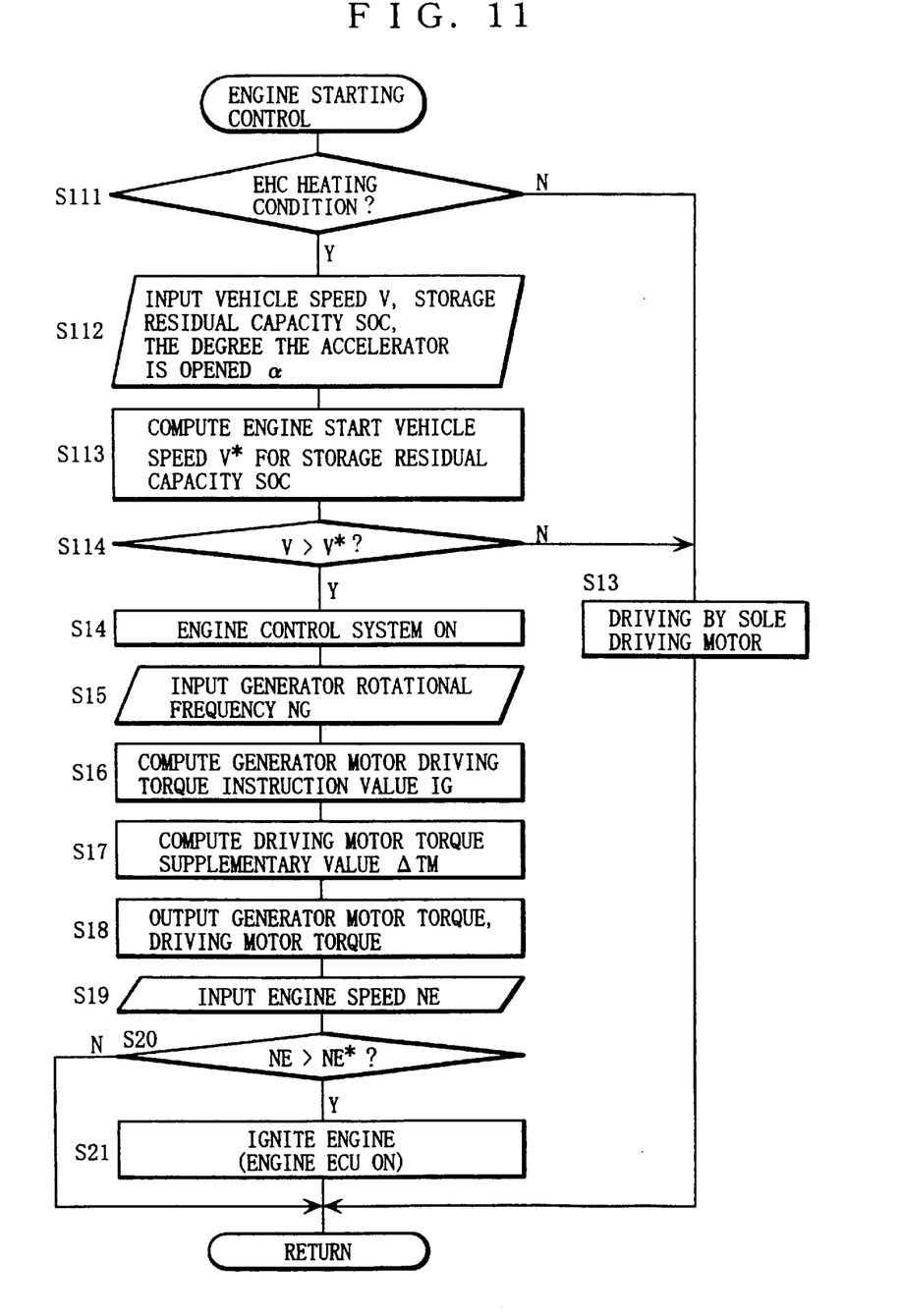
FIG. 11 is a flow chart of an engine starting control routine for a fourth embodiment of the present invention.

A fourth embodiment of the present invention is designed to start the engine after a catalyst used to treat the exhaust gas is sufficiently heated, as determined by a temperature sensor (not shown) in the sensor unit 41. FIG. 11 shows the operation routine for the fourth embodiment. In describing the routine of FIG. 11, the same step reference numerals used in FIG. 3 will be used to designate the steps which are the same as or similar to the steps of the embodiment illustrated in FIG. 3 and the description thereof is omitted.

In the fourth embodiment the vehicle control system 424 detects the temperature of the catalyst using the temperature sensor 416, judges whether or not the catalyst is sufficiently heated (Step 111) and, if the catalyst is judged not to be sufficiently heated ("No" in step 111), powers the vehicle by the driving motor alone.

If the catalyst is judged to be sufficiently heated ("Yes" in Step 111), the vehicle control system 424 receives inputs for the vehicle speed V, the storage residual capacity SOC and the degree of accelerator opening α from the respective sensors (Step 112). The engine starting speed V* is determined by applying the inputted storage residual capacity SOC to the map of FIG. 10 (Step 113). The vehicle speed V and the thus determined engine starting speed V* are then compared (Step 114).

If the vehicle speed V is smaller than the engine starting speed V* ("No" in Step 114), the routine proceeds to Step 13, and if V is greater than the engine starting speed V* ("Yes" in Step 114), the routine goes to Step 14. The operations from S14 on are the same as in the embodiment illustrated in FIG. 3. However, in FIG. 3 the storage residual capacity SOC is inputted in Step 15, but in FIG. 11 the SOC value utilized in Step S113 is inputted in Step S112.

A fifth embodiment is an adaptation of the first-described embodiment wherein the vehicle control system 424 controls the engine control unit 421 to follow an engine interruption scheme. In this fifth embodiment, the vehicle control unit 424 includes at least the accelerator pedal sensor 411, the vehicle speed sensor 412, a brake sensor (not shown) for detecting operation of the brake pedal and a gear shift sensor (not shown). The vehicle control system 424 causes the engine to stop, without requiring an idling state, by supplying an OFF signal to the engine control system 421, when a judgement is made, based on the sensor output signals, that operation of the engine is unnecessary.

The vehicle control system 424 determines, based on the signal for the degree of accelerator opening α, if the accelerator pedal has been released, e.g. for 2 seconds, or if the vehicle speed V is zero, based on the output signals of the accelerator pedal sensor 411 and the vehicle speed sensor 412. Thus, whenever the vehicle is in a state in which the accelerator pedal is not operated, for example, when the vehicle is waiting for a traffic light to change, when driving down a decline or when the vehicle is halted because of traffic congestion, the engine 1 need not be driven and, accordingly, the vehicle control system 424 supplies an OFF signal to the engine control system 421. Upon receipt of that OFF signal, the engine control system 421 stops the engine 1 from running by controlling the fuel system or the ignition system.

Upon stepping on the accelerator after the engine 1 has been halted, as described in connection with the first embodiment, the vehicle control unit 424 causes the engine to start again by controlling the generator/motor 3 and compensates for the additional torque requirement for starting the engine by increasing the driving motor torque. Incidentally, after the vehicle has halted, e.g. while waiting for a traffic signal to change, the engine is again started at the vehicle speed V*, after the vehicle has been started in motion by the driving motor 4.

While the present invention has been explained with reference to the aforementioned five embodiments, the present invention is not intended to be limited to those embodiments and is capable of various modifications. For example, while the first embodiment was described as starting the engine at the predetermined vehicle speed V*, it is also possible to start the engine as soon as the start of vehicle motion is detected (V*=0). Further, while in the first embodiment, the compensatory torque $\Delta TM$ is computed in the vehicle control unit 424, alternatively the compensatory torque $\Delta TM$ may be computed in the driving motor control unit 423 to which signals for the generator/motor torque TG and the rotational speed NG are supplied by the generator/motor control unit 422.

The generator/motor rotational speed NG is described as detected by the generator/motor rotational speed sensor 413 in the first embodiment but, alternatively, can be computed from input of the engine speed NE from the engine speed sensor 414. That is, when the generator/motor rotational speed (the sun gear) is NG, the engine speed (the carrier) is NE, and the output shaft rotational speed (the ring gear) is NR, and the number of the teeth on the ring gear 23 are twice the number on the sun gear 21, NG will be NG=3·NE−2·NR, so that the engine speed NE and the generator/motor rotational speed NG can be computed from each other. Accordingly, instead of detecting the generator/motor rotational speed NG with the generator/motor rotational speed sensor 413, the generator/motor rotational speed NG may be computed from the engine speed NE, detected by the engine speed sensor 414, and the generator/motor torque TG may be computed from the generator/motor rotational speed NG. As a result, the generator/motor rotational speed sensor 413 becomes unnecessary.

The first embodiment has the engine and the generator/motor connected through a planetary gear unit to the output shaft; however, in the present invention, the engine and the generator/motor may be connected through a differential gear unit bevel gear to the output shaft.

Furthermore, in the fourth embodiment, instead of detecting the temperature of the catalyst as described, the engine 1 may be started responsive to detection of the temperature of the engine 1 having reached a predetermined value. In yet another modification, the engine 1 may be started only after both the temperature of the catalyst and that of the engine reach predetermined temperatures.

The engine interruption system is described in connection with the fifth embodiment as generating an OFF signal, responsive to a lapse of two seconds after release of the accelerator pedal. However, it is also possible to generate an OFF signal to halt the engine upon satisfaction of conditions for both release of the accelerator pedal and vehicle speed. Further, the engine may be halted when the position of the gear shift lever is moved into neutral. Also in the fifth embodiment, the engine 1 can be halted by an OFF signal when the accelerator has been released for over one second, for example, instead of two seconds. It is also possible to halt the engine upon satisfaction of the conditions of accelerator pedal release and brake pedal engagement, regardless of the time the accelerator pedal has been released.

Furthermore, use of the engine interruption system is not limited to when the vehicle decelerates, is halted or the like. For example, the engine may be halted when the hybrid vehicle is during transition from driving solely by the engine to hybrid power.

In all embodiments described above, since the vehicle is started by the driving motor, with control of the motor/generator, the start is smooth.

The engine torque produced when the engine 1 is first started is supplemented by the output of the driving motor 4, resulting in decreased shock upon start of the engine.

In each embodiment, the efficiency of the engine during driving, in terms of fuel consumption, can be improved. That is, in halting or driving at low speed, the required energy is small, so that a larger amount of energy than is actually required can be stored in the battery 4. Therefore, the requirement for additional energy during driving is decreased, with the result that the engine 1 is driven at a low load. But, generally, in driving the engine 1 at a higher load, the efficiency is also improved.

The fifth embodiment turns OFF the engine, regardless of whether or not the engine is in an idling state, when it is judged that operation of the engine 1 is unnecessary, with the result that the fuel efficiency as a whole is improved because the fuel is not consumed for that off time.

In all embodiments, since the engine is started by torque from the motor 4, with control of generator/motor 3, a separate, designated starter becomes unnecessary and, if utilized, would be subjected to only a small load or would be used only in unusual circumstances.

In the fifth embodiment employing the engine interruption system, the engine is frequently halted and started again, but a starter and clutch are unnecessary because the engine is restarted with the motor 4 while controlling generator/motor 3. Since the load required to start the engine 1 is small compared to the capacity of the generator/motor and driving motor, the load on the generator/motor and driving motor is small. Further, the hybrid vehicle carries a battery of sufficient capacity so that the load on the battery is small when the engine 1 is started.

Furthermore, in the fifth embodiment, halting the engine produces minimal noise.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid vehicle comprising:

an engine;

a drive shaft connected with drive wheels;

a generator/motor rotatable in a negative direction as a generator and in a positive direction as a motor;

a driving motor;

driving motor control means for controlling said driving motor;

a differential gear device having a first element connected to said generator/motor, a second element connected to said engine, and a third element connected to said drive shaft;

vehicle speed detection means for detecting vehicle speed; and vehicle control means for powering the vehicle by said drawing motor alone when the vehicle speed detected by said vehicle speed detection means is lower than a predetermined starting vehicle speed, and for starting said engine by changing the rotation of said generator/motor from the negative direction to the positive direction when the vehicle speed has exceeded the predetermined starting vehicle speed during the powering by said driving motor alone.

2. The hybrid vehicle according to claim 1, wherein said driving motor control means controls said driving motor to output a compensatory torque to compensate for torque used to rotate the engine in starting said engine.

3. The hybrid vehicle according to claim 2, wherein said vehicle control means signals said driving motor control means to control said driving motor to output a total torque equal to the sum of said compensatory torque and a driving torque for said powering of the vehicle.

4. The hybrid vehicle according to claim 3, wherein said vehicle control system calculates an output torque of said generator/motor, and computes the compensatory torque based on the calculated output torque.

5. The hybrid vehicle according to claim 3, wherein said vehicle control system computes said compensatory torque based on an output torque and a rotational speed of said generator/motor.

6. The hybrid vehicle according to claim 1, further comprising residual charge detection means for detecting residual charge of a battery, said battery supplying electric power to said driving motor, and wherein said vehicle control means changes the predetermined starting vehicle speed based on the residual charge of the battery which is detected by said residual charge detection means.

7. The hybrid vehicle according to claim 1, wherein said vehicle control means starts said engine on the condition that a temperature of catalyst for treating exhaust gas from said engine exceeds a predetermined temperature.

8. The hybrid vehicle according to claim 1, wherein said vehicle control means starts said engine on the condition that a temperature of said engine exceeds a predetermined temperature.

9. The hybrid vehicle according to claim 1, wherein said vehicle control means starts said engine on the conditions that a temperature of catalyst for treating exhaust gas from said engine exceeds a first predetermined temperature, and a temperature of said engine exceeds a second predetermined temperature.

10. The hybrid vehicle according to claim 1, wherein said vehicle control means starts said engine on the condition that a temperature of said engine exceeds a predetermined temperature.

11. A hybrid vehicle, having an engine, a driving motor, a generator/motor, and a drive shaft connected with drive wheels, in which the output torque of the engine is input to a stator of the generator, is transferred to a rotor of the generator and is then transferred to the drive shaft, said generator/motor being rotatable in a negative direction as a generator and in a positive direction as a motor, said hybrid vehicle comprising:

driving motor control means for controlling the driving motor;

vehicle speed detection means for detecting vehicle speed; and vehicle control means for powering the vehicle by said driving motor alone when the vehicle speed detected by said vehicle speed detection means is lower than a predetermined starting vehicle speed, and for starting said engine by changing the rotation of said generator/motor from in the negative direction to in the positive direction when the vehicle speed has exceeded the predetermined starting vehicle speed during the driving by said driving motor alone.

12. The hybrid vehicle according to claim 11, wherein said driving motor control means controls said driving motor to output a compensatory torque to compensate for drag on said generator/motor caused by starting said engine.

13. The hybrid vehicle according to claim 12, wherein said vehicle control means signals said driving motor control means to control said driving motor to output a total torque equal to the sum of said compensatory torque and a driving torque for said powering of the vehicle.

14. The hybrid vehicle according to claim 13, wherein said vehicle control system calculates an output torque of said generator/motor, and computes the compensatory torque based on the calculated output torque.

15. The hybrid vehicle according to claim 12, wherein said vehicle control system computes said compensatory torque based on an output torque and a rotational speed of said generator/motor.

16. The hybrid vehicle according to claim 11, further comprising residual charge detection means for detecting residual charge of a battery, said battery supplying electric power to said driving motor, and wherein said vehicle control means changes the predetermined starting vehicle speed based on the residual charge of the battery which is detected by said residual charge detection means.

17. The hybrid vehicle according to claim 11, wherein said vehicle control means starts said engine on the condition that a temperature of catalyst for treating exhaust gas from said engine exceeds a predetermined temperature.

18. A method for controlling a hybrid vehicle having an engine, a drive shaft connected with drive wheels, a generator/motor, a driving motor and a differential gear device having a first element connected to the generator/motor, a second element connected to the engine, and a third element connected to the drive shaft, comprising the steps of:

starting the vehicle forward from standstill under power of the driving motor alone;

rotating the engine under power of the generator/motor when the vehicle reaches a predetermined speed; and increasing torque output of the driving motor to compensate for drag on the generator/motor caused by said rotating of the engine.

19. A method for controlling a hybrid vehicle having an engine, a drive shaft connected with drive wheels, a generator/motor, a driving motor and a differential gear device having a first element connected to the generator/motor, a second element connected to the engine, and a third element connected to the drive shaft, comprising the steps of:

starting the vehicle forward from standstill under power of the driving motor alone;

rotating the engine under power of the generator/motor when the vehicle reaches a predetermined speed;

starting the engine when engine speed exceeds an engine speed predetermined to allow the engine to ignite; and increasing torque output of the driving motor to compensate for drag on the generator/motor caused by said rotating of the engine.

* * * * *

UNITED STATES PATENT AND TRADEMARK OFFICE
CERTIFICATE OF CORRECTION

PATENT NO. : 5,865,263
DATED : February 2, 1999
INVENTOR(S) : YAMAGUCHI et al

It is certified that error appears in the above-identified patent and that said Letters Patent is hereby corrected as shown below:

Col. 12, line 49, delete "drawing" insert --driving--.

Signed and Sealed this

Sixth Day of June, 2000

Attest:

Q. TODD DICKINSON

Attesting Officer     Director of Patents and Trademarks